Jan. 3, 1950 P. PELLEGRINI 2,493,639
FOLDING VEHICLE STEP
Filed July 30, 1945

INVENTOR.
PHILLIP PELLEGRINI
BY
Attorney

Patented Jan. 3, 1950

2,493,639

UNITED STATES PATENT OFFICE 2,493,639

FOLDING VEHICLE STEP

Phillip Pellegrini, Glendale, Calif.

Application July 30, 1945, Serial No. 607,792

4 Claims. (Cl. 280—166)

This invention relates to folding vehicle steps especially adapted for ready application to the sides or rear end of motor driven trucks, and a primary object is to provide a structure of maximum simplicity, economy, efficiency and rigidity, and which is adapted to fold inwardly to inoperative position beneath the truck bed, and to be extended to operative position outwardly of the bed at will.

A particular object is to so support a pair or more of steps with an upper step hingedly attached to the truck bed, and at least one lower step hingedly supported on the upper step in such a manner that the lower step may be first folded on the upper step so as to nest thereon, and the upper and lower steps may be together retracted into over balanced position on common supports, whereby the then inoperative steps are held by gravity against accidental extension.

Another object is to so hinge the steps together and to hinge the upper step on suitable supports as to apply friction to the connected members for preventing rattling and displacement of the structure from a desired position.

A further object is to provide means for limiting the extension and retraction of the structure. Other objects may appear as the description of my improvements progresses.

In the consideration of my invention reference is had to Letters Patent of the United States, Nos. 2,246,985 and 2,246,986, granted to me on June 24, 1941, for folding vehicle steps for the same purpose as my present structure, but embodying different forms.

I have shown a preferred structure embodying my invention in the accompanying drawing subject, however, to modification within the scope of the appended claims, without departing from the spirit of the invention.

Briefly described, my improved step structure includes a pair of inverted L-shaped supports A, A attachable to the bed B of a vehicle, either at a side or rear end, an upper step unit C hingedly attached to supports A, A, and a second and lower step unit D hingedly attached to the unit C.

Members A, A each have horizontal arms 1 adapted to underlie and be attached to the vehicle bed B as by means of bolts 2 and depending legs 3 and may be formed of angle cross section or other structural shapes to provide rigidity and requisite strength.

Figure 1:
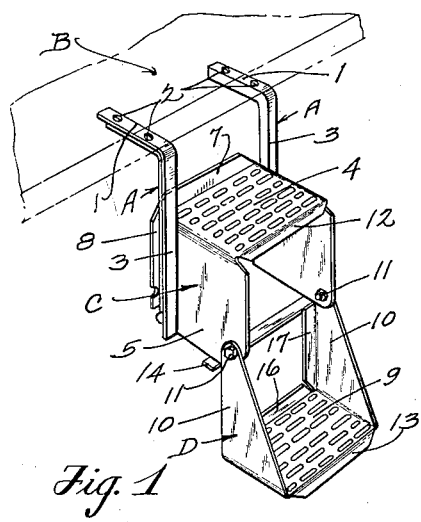
Fig. 1 is a perspective view of a folding vehicle step embodying my improvements in which the structure is shown extended from a vehicle bed for use.
Figure 3:
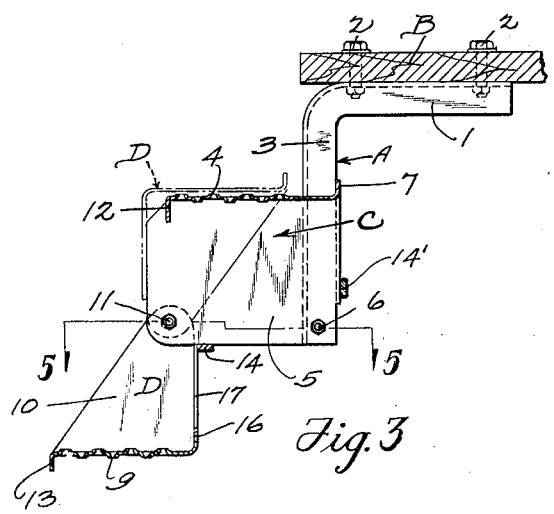
Fig. 3 is a sectional elevation on line 3—3 of Fig. 2.
Figure 4:
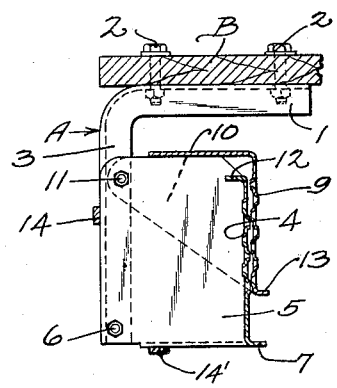
Fig. 4 is a sectional elevation on line 3—3 of Fig. 2, showing the structure folded and retracted to inoperative position.

The upper step unit may be formed as shown of a single sheet of pressed steel of inverted U cross section, with a tread 4 and similar sides 5, 5 which are hinged at alined points to the lower portions of legs 3, 3 as by means of bolts 6, 6. The rear end of step C has an upturned flange 7 and laterally extended flanges 8, 8 which latter flanges when the step is extended, as shown in Figs. 1 and 3, engage the rear edges of legs 3, 3, respectively, for limiting the outward movement of the step and holding it in operative position. The hinge bolts 6 are positioned as close to the front edges of legs 3 as possible, so that when the step is retracted a maximum proportion of the weight of the unit will be rearwardly of the plane of the hinges, as shown in Fig. 4.

The step D is also of U cross section and formed integrally of sheet metal with a tread 9 and sides 10, 10 which are hinged at horizontally alined points to be forward and lower corner portions of the sides 5, 5 of step C, as by means of bolts 11, 11. Preferably treads 4 and 9 have depending aprons 12 and 13, at their front edges which serve to strengthen the treads.

Step C has a bar 14 horizontally extended thereacross and affixed as by welding or otherwise to the lower edges of sides 5, 5 and adapted to engage the rear edges of sides 10, 10 of step D when said steps are extended, as shown in Figs. 1 and 3, for limiting the inward swing of step D beyond operative position, and also for limiting the inward swing of step C (Fig. 4) when steps C and D are retracted, as when said bar engages the front of supports A, A.

Figure 5:
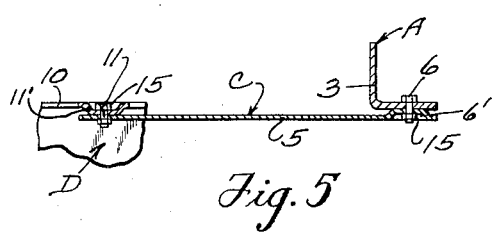
Fig. 5 is a fragmentary section on line 5—5 of Fig. 3.

As shown in Fig. 5, the hinge joints 6 and 11 are formed with depressions 6' and 11', respectively, in members C and D in order that the nuts (as at 15) may be housed in the indentations and thereby permit the free folding of units C and D one upon the other.

Normally the structure is retracted to a position beneath the vehicle bed B, as shown in Fig. 4, with step D folded upon step C, and the folded steps swung inwardly (to the right) on the hinge bolts 6 against the friction at the hinge joints and held by the overbalanced weight of the two step units against accidental displacement and extension. I may provide an upwardly extending rib 16 at the edge of tread 9, and inwardly turned flanges 17 at the rear edges of sides 10 for the purpose of stiffening the tread 9 sufficiently to bear the weight of a person with adequate safety.

In operation, with the step units assembled and mounted on a vehicle as shown in Fig. 4, the nested units C and D are together pulled outwardly from their positions beneath and inwardly of the edge of bed B until they assume the position shown in Fig. 3 (unit D being therein indicated in broken lines) after which unit D is swung outwardly and downwardly to the position shown in Figs. 1 and 3.

Reversely, when it is desired to retract the steps, unit D is first folded onto unit C (Fig. 3) and the two units are then swung into the position shown in Fig. 4.

Figure 2:
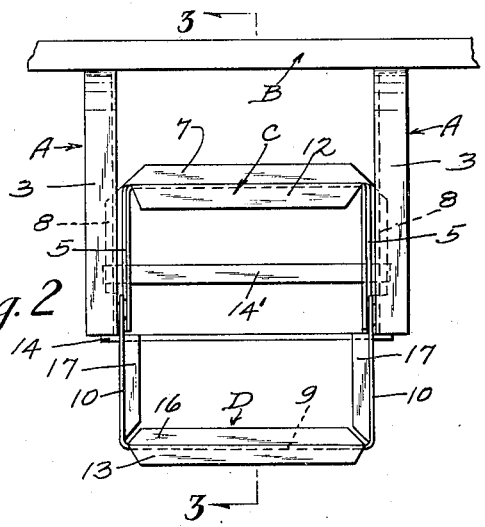
Fig. 2 is a front elevation thereof.

As shown in Figs. 2, 3, and 4, a transverse bar 14' may connect the sides 5, 5 of step C for affording ample rigidity.

The essence of the invention is to provide a step structure embodying a suitable bracket attachable to a marginal portion of a vehicle bed, and preferably including spaced depending legs to which the upper step is hinged, and a lower step hinged to the upper step and foldable thereon so that the two steps may be together swung into and out of operative position, and whereby, when the unit is bodily extended, the lower step may be swung relative to the upper step into operative position.

I claim:

1. A vehicle step comprising: in combination with a vehicle bed, a pair of parallel supports having portions attachable to said bed and having depending legs adjacent an edge of the bed, an upper step unit hinged at its rear margin to said legs so as to swing inwardly to overbalanced retracted position beneath the bed, and a lower step unit hinged to the forward portion of the upper unit and adapted to swing upwardly and inwardly thereon for retraction with the upper unit to inoperative position, and flanges on the upper unit engageable with said supports for limiting the extension thereof beyond operative position, and a bar secured to the upper unit and engageable with and for limiting the swinging movement of the lower unit when said units are swung into operative position.

2. A vehicle step comprising: means attachable to a vehicle bed for hingedly supporting a step unit in extensible and retractible position, a step including a tread and laterally spaced portions pivotally secured to the supporting means so that when the step unit is extended for use the tread will be disposed in a substantially horizontal plane above and will project substantially forwardly of the axis of the unit, and when retracted to an inoperative position will be in a plane spaced substantially rearwardly of the axis, and a second step formed with a tread and lateral portions hinged to and depending from the forward portion of said first mentioned step, and means carried by the upper step for limiting the forward turning movement of the back of the upper step and further means carried by the upper step to limit the rearward movement of the lower step, when the steps are extended for use.

3. A vehicle step comprising: means attachable to a vehicle bed for hingedly supporting a step unit in extensible and retractible position, a step including a tread and laterally spaced portions pivotally secured to the supporting means so that when the step unit is extended for use the tread will be disposed in a substantially horizontal plane above and will project substantially forwardly of the axis of the unit, and when retracted to an inoperative position will be in a plane spaced substantially rearwardly of the axis, and a second step formed with a tread and lateral portions hinged to and depending from the forward portion of said first mentioned step, and means carried by the upper step for limiting the forward movement of the upper step and further means carried by the upper step for limiting the rearward movement of the lower step, when the steps are extended for use, said lower step being foldable on the upper step and the two steps together adapted to be swung from extended to retracted position.

4. In combination with a vehicle bed, a pair of downwardly extending supports attachable to a marginal portion of the bed and including a pair of depending legs, an upper and a lower step hinged together so that the lower step may be folded into nested position on the upper step and extended therefrom for use, at will, and means for hingedly supporting the upper step on the legs of said bracket, so that when the steps are extended the upper step will be disposed outwardly of the edge of the bed, and when both steps are retracted the unit will be supported inwardly of the edge of the bed, the two steps being movable together when they are nested one upon the other for extension and retraction, means mounted on the upper step for commonly limiting the extension of the two steps to operative position, and means for limiting the retraction of the lower step relative to the upper step when the steps are folded under the bed.

PHILLIP PELLEGRINI.

REFERENCES CITED

The following references are of record in the file of this patent:

UNITED STATES PATENTS

| Number | Name | Date |
|---|---|---|
| 560,752 | Prator et al. | May 26, 1896 |
| 1,193,466 | Mealer | Aug. 1, 1916 |
| 2,246,985 | Pellegrini | June 24, 1941 |
| 2,246,986 | Pellegrini | June 24, 1941 |